US00RE36808E

United States Patent [19]

Caldwell

[11] E Patent Number: Re. 36,808

[45] Reissued Date of Patent: Aug. 8, 2000

[54] PORTABLE LIFE SUPPORT SYSTEM

[75] Inventor: Bruce D. Caldwell, Hitchcock, Tex.

[73] Assignee: Oceaneering International, Inc., Houston, Tex.

[21] Appl. No.: 08/746,287

[22] Filed: Nov. 7, 1996

Related U.S. Patent Documents

Reissue of:

[64] Patent No.: 5,361,591
Issued: Nov. 8, 1994
Appl. No.: 07/869,249
Filed: Apr. 15, 1992

[51] Int. Cl.[7] ..... F17C 9/04

[52] U.S. Cl. ..... 62/50.4; 62/259.3; 62/50.2; 165/46

[58] Field of Search ..... 62/259.3, 50.2, 62/50.4; 165/46

[56] References Cited

U.S. PATENT DOCUMENTS

| | | | |
|---|---|---|---|
| 2,945,354 | 7/1960 | Moskowitz | 62/50.2 |
| 2,990,695 | 7/1961 | Leffingwell, Jr. . | |
| 3,064,448 | 11/1962 | Whittington . | |
| 3,112,724 | 12/1963 | Rosen | 62/48.1 |

(List continued on next page.)

FOREIGN PATENT DOCUMENTS

| | | |
|---|---|---|
| 2227879 | 11/1974 | France . |
| 414170 | 5/1925 | Germany . |

OTHER PUBLICATIONS

"NBPLSS Status Report" Viewgraph Packet, by Willis & Caldwell, dated Aug. 19, 1991, 7 pages.

"NBPLSS Pre–Prototype Un–Manned Testing Quick Look Report" Viewgraph Packet, by Myers & Sprick, dated Dec. 11, 1991, 27 pages.

"NBPLSS Pre–Prototype Un–Manned Testing Quick Look Report" Viewgraph Packet, by Myers & Sprick, dated Dec. 11, 1991, 15 pages.

"NBPLSS Pre–Prototype Un–Manned Testing Quick Look Report" Viewgraph Packet, by Myers & Sprick, dated Feb. 11, 1992, 26 pages.

"Neutral Buoyancy Portable Life Support System Unmanned Testing Report", by Myers & Sprick, dated Jan. 28, 1992, 37 pages.

"Neutral Buoyancy Lab, Portable Life Support System Preliminary Design", by Willis, Caldwell & Sprick, dated Dec. 13, 1990, 59 pages.

"Neutral Buoyancy Lab, Portable Life Support System Directorate Presentation", by Willis, dated Dec. 5, 1990, 14 pages.

"Neutral Buoyancy Lab, Portable Life Support System Directorate Presentation", by Willis, dated Dec. 5, 1990, 47 pages.

"Neutral Buoyancy Lab, Portable Life Support System Project Status Briefing", by Nasa, Lockheed, Ocean Systems Engineering, dated Oct. 4, 1990, 52 pages.

H.E. Agen et al., A Liquid Air Device For Cooling The Wearer of a Totally Enclosed Liquid Rocket Propellant Handler's Suit, H.E. Agen et al., pp. 196–202.

*Primary Examiner*—Ronald Capossela
*Attorney, Agent, or Firm*—Kurt S. Myers

[57] ABSTRACT

The invention in its preferred embodiment is a portable life support system providing the wearer of a garment with temperature regulation and a breathable atmosphere using cryogenic technology. Wherein a liquid cryogen is vaporized by heat exchange with the wearers body and the vaporized cryogen is delivered to the wearer as a breathable atmosphere.

34 Claims, 6 Drawing Sheets

U.S. PATENT DOCUMENTS

| | | | |
|---|---|---|---|
| 3,117,426 | 1/1964 | Fischer et al. . | |
| 3,227,208 | 1/1966 | Potter, Jr. et al. . | |
| 3,232,066 | 2/1966 | Peterson et al. | 62/48.1 |
| 3,263,433 | 8/1966 | Fitt | 62/50.2 |
| 3,343,536 | 9/1967 | Brisson et al. | 62/259.3 |
| 3,345,641 | 10/1967 | Jennings et al. . | |
| 3,378,063 | 4/1968 | Mefferd | 62/50.4 |
| 3,570,481 | 3/1971 | Woodberry, Jr. | 62/50.2 |
| 3,635,216 | 1/1972 | Curtis . | |
| 3,648,289 | 3/1972 | Moreland . | |
| 3,730,178 | 5/1973 | Moreland . | |
| 3,775,976 | 12/1973 | Karig | 62/50.2 |
| 3,797,262 | 3/1974 | Eigenbrod | 62/48.1 |
| 3,807,396 | 4/1974 | Fischel . | |
| 3,831,594 | 8/1974 | Rein . | |
| 3,984,222 | 10/1976 | De Haan | 62/48.1 |
| 4,024,730 | 5/1977 | Bell et al. | 62/259.3 |
| 4,133,376 | 1/1979 | Eilenberg et al. . | |
| 4,172,454 | 10/1979 | Warncke et al. . | |
| 4,174,619 | 11/1979 | Tocha | 62/50.2 |
| 4,286,439 | 9/1981 | Pasternack . | |
| 4,299,091 | 11/1981 | Carter et al. | 62/48.1 |
| 4,339,927 | 7/1982 | Sarcia . | |
| 4,425,764 | 1/1984 | Lam et al. . | |
| 4,459,822 | 7/1984 | Pasternack et al. . | |
| 4,464,904 | 8/1984 | Steigman | 62/50.2 |
| 4,580,411 | 4/1986 | Orfitelli . | |
| 4,633,125 | 12/1986 | Blosser et al. | 313/62 |
| 4,727,255 | 2/1988 | Monier et al. . | |
| 4,783,853 | 11/1988 | Zuber . | |
| 4,838,270 | 6/1989 | Donnerhack et al. . | |
| 4,854,128 | 8/1989 | Zeamer . | |
| 4,951,660 | 8/1990 | Lubitzsch . | |

AIR LOOP SIDE
LCG SIDE
12
12a
12b
CO2 SCRUBBER
HUMIDITY CONTROL
VENT/POOL HX
P
V
10
14
16
18
19
22a
22b
22c
22d
24
26
27
28
31
32
33
34
35
36
37
38a
38b
38c
38d
38e
39
52
54
102
106

PORTABLE LIFE SUPPORT SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to a portable life support system and, more particularly, an improved portable life support system employing a liquid cryogen to provide temperature regulation and breathable atmosphere for the wearer of a garment or suit.

2. Description of the Prior Art

Portable life support systems are typically used in environments that are uninhabitable or otherwise hostile to humans. Examples of such environments include space, underwater, fire fighting, and hazardous materials handling. The two most critical requirements of a portable life support system, from an environmental control perspective, are providing body temperature regulation and a breathable atmosphere for the users.

Technical requirements for such systems vary widely and are constrained by activity type and performance level. However, generally desirable characteristics of personal portable life support systems include a weight that can be carried by a single person, a size that can be carried by a single person without undue loss of mobility, operation without the necessity for an umbilical, and a design that will not impair the dexterity of the user. Although these characteristics may vary depending on the environment, they are generally desirable and generally consistent.

Subsystems providing breathable atmosphere for portable life support systems are generally classed as either open circuit, semi-closed circuit, or closed circuit, depending on the proportion of atmosphere recirculated. In an open circuit subsystem, atmosphere is immediately vented from the system upon exhalation by the user whereas all atmosphere exhaled is recycled in a closed system. A semi-closed system falls somewhere in between, venting significant amounts of exhaled atmosphere but also recirculating large amounts.

Breathable atmosphere subsystems may also be grouped according to the type of breathing mechanism employed. The simplest type is the "free flow" system, wherein atmosphere is provided to the user at a continuous, relatively constant rate regardless of the level of activity. A "demand" system employs a demand regulator like those used with SCUBA equipment to provide breathable atmosphere only when the user inhales atmosphere, i.e., on demand. Demand systems can be employed orally or with a combined oral and nasal delivery.

The need for a hazardous material suit for liquid fuel handlers prompted efforts by the United States Army in this area by the early 1960's. These efforts were primarily directed at systems having separate subsystems dedicated to either body temperature regulation or breathing, but were eventually directed to the use of "liquid air" as a cryogenic fluid to provide both body temperature regulation and breathable atmosphere. The design incorporated a straight semi-closed circuit breathing system in which a breathable atmosphere was generated by vaporizing liquid air. The vaporization process provided minimal cooling and body temperature regulation was achieved through circulation and recirculation of vaporized cryogen through the user's suit.

A cryogenic fluid may be defined as a fluid which boils (i.e., changes state from liquid to gas) at temperatures less than approximately 110K at atmospheric pressure. Examples of the cryogen include both nitrogen and oxygen (the primary components of "liquid air") as well as hydrogen, helium and methane. As used herein, "cryogen" shall refer to a cryogenic fluid and "cryogenic technology" shall refer to knowledge, techniques, and equipment for harnessing the physical properties of cryogenic fluids to practical applications.

However, cryogenic technology in portable life support systems quickly encountered many technical constraints. Portable life support system technology furthermore diverged from the approach in the early Army studies to create two schools of thought as the technology matured. One school of thought continued to use cryogen for cooling and to generate breathable atmosphere. This approach is disclosed in U.S. Pat. No. 3,064,448 issued to P. E. Whittington, U.S. Pat. No. 3,117,426 issued to R. A. Fischer et al., U.S. Pat. No. 3,227,208 issued to V. L. Potter, Jr. et al., and U.S. Pat. No. 2,990,695 issued to D. A. Leffingwell, Jr.

The divergent school of thought was prompted by efforts to achieve breakthroughs in efficiency and began by separating the body temperature regulation and breathing subsystems. Examples of this school of thought are found in U.S. Pat. No. 4,172,454 issued to Warnecke et al., and U.S. Pat. Nos. 4,286,439 and 4,459,822 issued to Pasternack. The separation of temperature regulation and breathing subsystems removed technical constraints to permit use of more effective and more dangerous coolants that were not cryogenic fluids. As noted in the '454 Warnecke et al. patent, some in the art switched to solid coolants such as dry ice instead of cryogenic fluids.

One of the primary difficulties that led to the divergence of thought was that the early applications of cryogenic technology could not produce high efficiencies in terms of adequate and controllable body cooling and duration per unit weight. We have discovered that the source of this problem was ineffective heat exchange. Cooling was primarily provided by heat exchange between circulating air and the user's body i.e., in a gas phase loop. Our invention takes advantage of the fact that heat exchange in a liquid phase loop is far superior to heat exchange in a gas phase loop. This superiority arises from a number of factors, foremost of which is greater control over the heat exchange process.

A second difficulty that still plagues cryogenic life support systems arises from the reliance of such systems on user orientation relative to the field of gravity. Breathable atmosphere subsystems employing air under pressure, such as SCUBA, are "orientationally independent" because the gas under pressure will expand through its natural properties to provide constant supply to the user. However, liquids perform fundamentally differently and require a motive force for delivery to the point of heat exchange where they vaporize. Virtually all cryogenic systems known heretofore employ gravity by storing the liquid cryogen relative to the point of heat exchange and current "orientationally independent" delivery systems are inefficient and costly.

The current systems deliver the dewar contents by separating the vaporized cryogen in the dewar, which is then pressurized, and the liquid cryogen, which is expelled by the force exerted by pressurized vaporized cryogen in the dewar. The separation results from the differing effects of gravity on the liquid cryogen and the vaporized cryogen and operates to separate them. An intake port in the dewar is submerged by the separated liquid cryogen which is then delivered by the further effects of gravity. Relying on gravity therefore causes a marked decrease in performance because whenever the system user affects the orientation of the delivery with respect to the gravitational field, the dewar contents lose pressurization and delivery becomes less effective as the vaporized cryogen is rapidly vented through the intake port which is no longer submerged in the liquid cryogen.

The problem is compounded in space where there is only negligible gravity regardless of orientation. Most systems in space therefore use "liquid acquisition devices" which employ an extremely fine mesh to separate the gas and liquid phases. However, the mesh is extremely fine and consequently very sensitive to manufacturing tolerances and very expensive. Also, liquid acquisition devices must be "tuned" to the particular cryogen in use and so are not readily adaptable to a wide variety of cryogens. There consequently also is some debate as to whether liquid acquisition devices are efficiently operable with cryogenic mixtures comprising two or more cryogens having separately identifiable physical properties.

Thus, the inability to achieve effective heat transfer and to develop a satisfactory orientationally independent delivery caused some in the art to abandon cryogenic technology or to adopt undesirable but necessary alternatives. These shortcomings affected both primary functions of the system and resulted in the functional division of the system as first proposed in the 1960's into separate, functionally dedicated, subsystems. This, in turn, led to the return of compressed gas for breathable atmospheres and dangerous liquid coolants, and even solid coolants, for temperature regulation.

It is therefore an object of this invention to overcome these problems with portable life support system employing cryogenic technology that effectively combines body temperature regulation and delivery of a breathable atmosphere.

It is furthermore an object of this invention that, in various embodiments, the system employs breathable atmosphere subsystems in open circuit, semi-closed circuit, and closed circuit configurations with either straight or demand supply via either oral or combination oral/nasal regulators.

It is a still further object of this invention to provide a system which employs orientationally independent delivery of liquid cryogen from storage to the point of heat exchange.

SUMMARY OF THE INVENTION

The invention in its preferred embodiment is a portable life support system providing temperature regulation and a breathable atmosphere using cryogenic technology. The invention comprises a liquid cooled garment, a source of liquid cryogen, a means for circulating the liquid cryogen from the source in heat exchange relation with the liquid of the garment to vaporize the liquid cryogen and cool the wearer of the garment, and a means for delivering the vaporized cryogen to the wearer for breathing.

BRIEF DESCRIPTION OF THE DRAWINGS

A more particular description of the invention briefly summarized above can be had by reference of the exemplary preferred embodiments illustrated in the drawings of this specification so that the manner in which the above cited features, as well as others that will become apparent, are obtained and can be understood in detail. The drawings nevertheless illustrate only typical, preferred embodiments of the invention and are not to be considered limiting of its scope as the invention will admit to other equally effective embodiments.

In the drawings.

DESCRIPTION OF THE PREFERRED EMBODIMENTS

Figure 1:
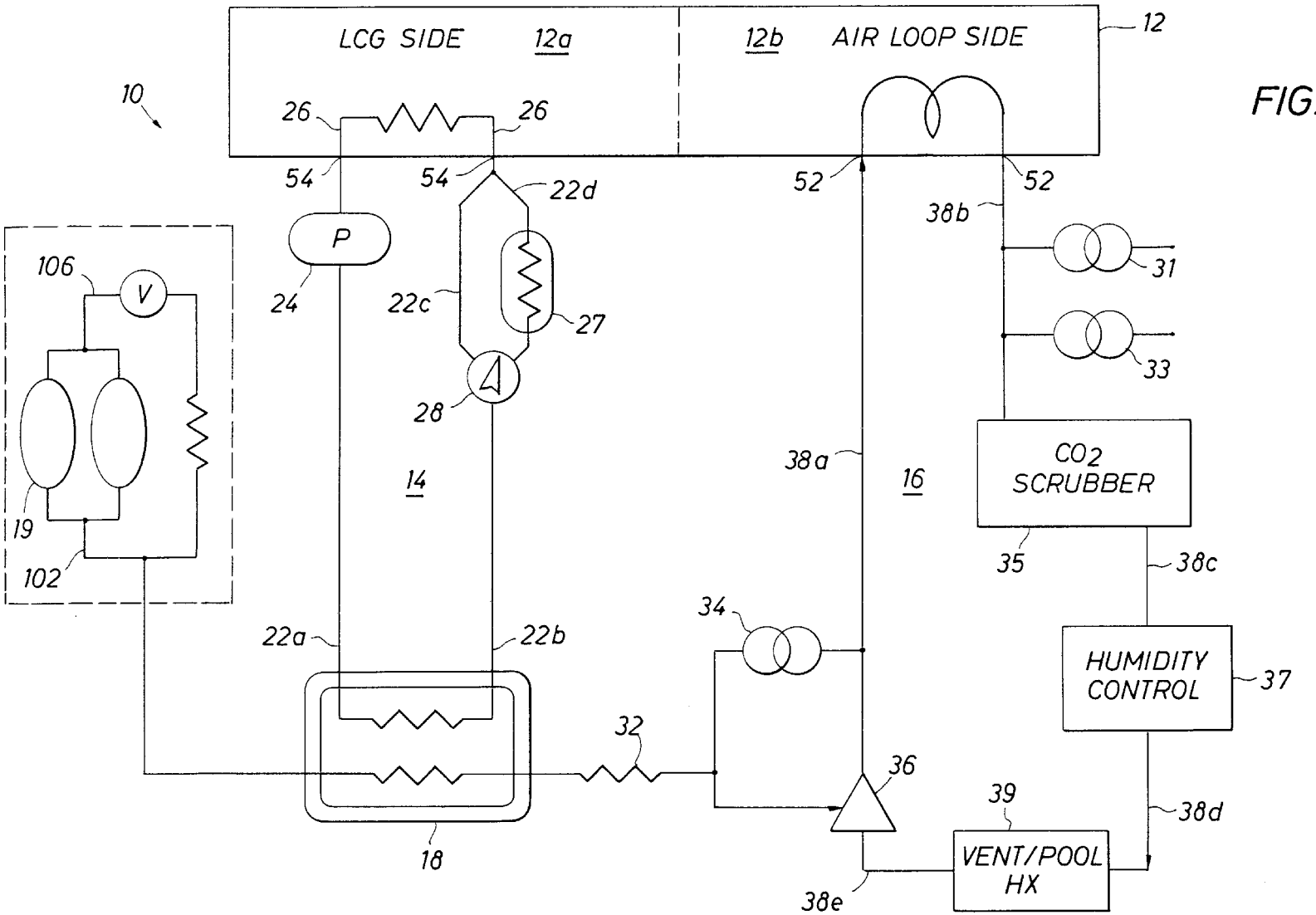
FIG. 1 is a schematic illustration of an embodiment of a portable life support system constructed in accordance with the present invention which employs a semi-closed circuit breathing loop.

The system of FIG. 1, generally denoted 10, is a portable life support system for use in underwater environments wherein cooling is required, including, but not limited to, warm water diving such as in heated pools, power plant cooling water, nuclear reactor contaminant vessels, or shallow tropical waters. Operations in underwater environments must account for increased pressures (relative to atmospheric pressure) and so system 10 compensates for pressure fluctuations as described below.

Figure 4:
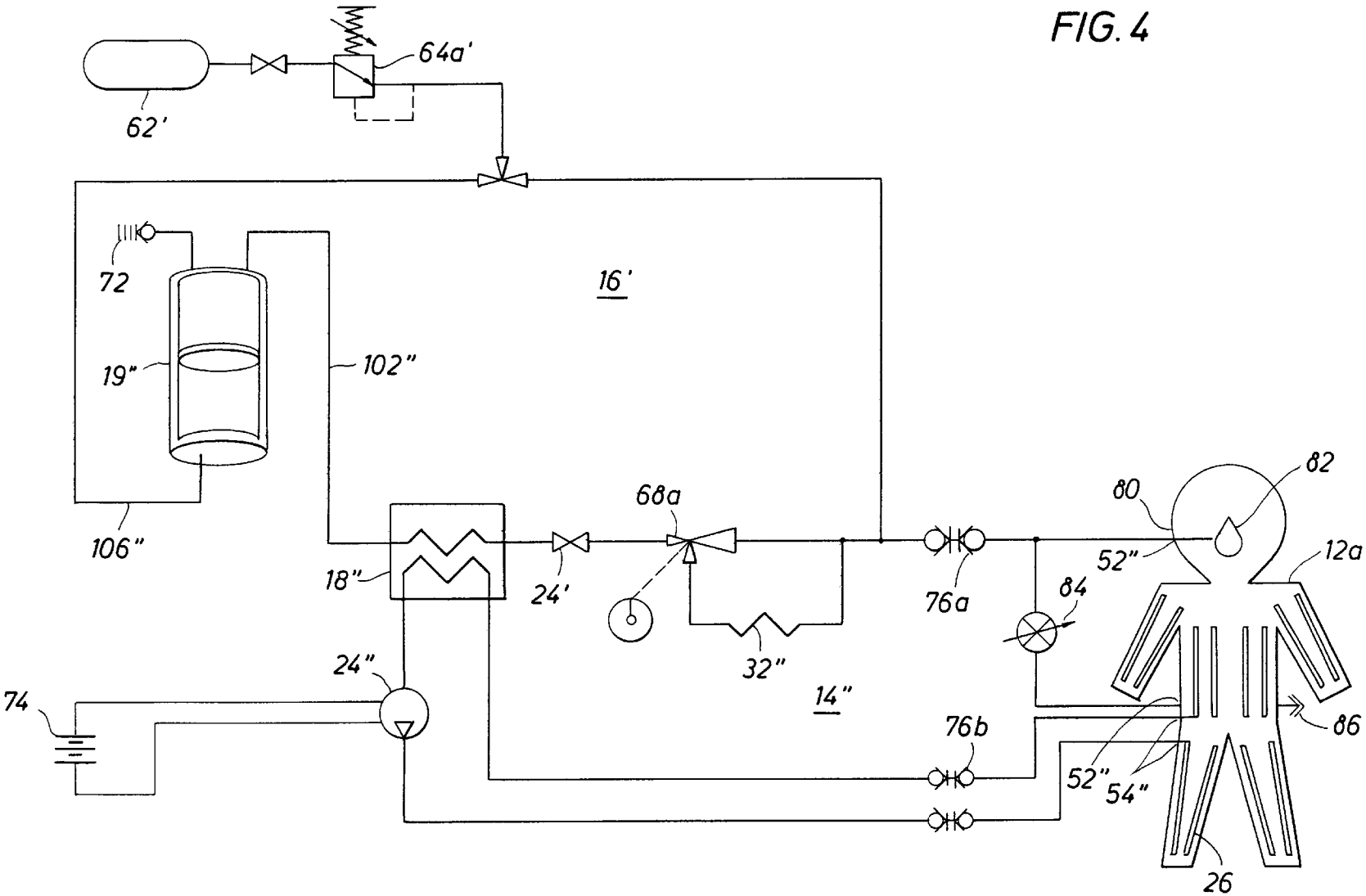
FIG. 4 is a schematic illustration of a third embodiment of the invention which employs an open circuit, demand breathing loop.

Portable life support system 10 is generally comprised of garment 12, cooling loop 14, breathing loop 16, heat exchanger 18, and dewars 19. As best illustrated in FIG. 4, garment 12 in the preferred embodiment is worn by the user inside suit 80 which isolates the user from the surrounding environment. However, the functions of garment 12 and suit 80 may be combined in some embodiments. Heat exchanger 18 and dewars 19 technically can be considered as a part of both cooling loop 14 and breathing loop 16 since their functions are required by both, but are treated separately to facilitate discussion of the operation of system 10 as a whole. Suit pressurization regulator 34, overpressure relief regulator 31, and back-pressure regulator 33 provide pressure regulation to maintain suit pressure of suit 80 equal to or at a constant pressure differential over ambient pressure within system 10 in response to pressure fluctuations in the environment in a manner well known to the art.

In operation, dewars 19 store liquid cryogen and deliver the liquid cryogen to heat exchanger 18. In the preferred embodiment the liquid cryogen is "liquid air", essentially liquid oxygen diluted with liquid nitrogen, but other cryogens may be acceptable depending on the application. Cooling loop 14 is a closed, cooled liquid loop, the cooled liquid of which absorbs the heat from the wearer's body and transfers the absorbed heat to the liquid cryogen delivered by dewars 19 to heat exchanger 18. The liquid cryogen vaporizes and the vaporized cryogen is warmed (as explained below) as the heat is transferred from the cooled liquid. The warmed vaporized cryogen is then delivered to the user as breathable atmosphere via breathing loop 16.

Body temperature regulation for the wearer of garment 12 is provided via temperature control of the cooled liquid circulated through cooling loop 14. As best shown in FIG. 4, garment 12 is comprised of liquid cooled garment 12 and an outer protective garment, referred to as a "suit" 80 which provides environmental isolation for the wearer of garment 12, both as are commonly, known in the art. As such, garment 12 has a number of "tubes" sewn into it that comprise a series of arteries to conduct a cooled liquid, such as water, in a predetermined pattern over the body of the person wearing the garment.

These "tubes" are functionally represented as garment line 26 in FIG. 1 and are best shown in FIG. 4. The cooled liquid absorbs the heat of the wearer's body as it courses through the tubes, thereby warming the liquid and cooling the wearer through heat exchange. The tube suit which comprises garment 12 is merely one means by which a conduction convection heat exchange relationship with the body of the wearer of the garment and other means may be equally acceptable.

Cooling loop 14 comprises insulated lines 22*a–c,* water pump 24, garment line 26, auxiliary heat exchanger 27, and proportional diverter valve 28. Water pump 24 provides the motive force that pumps the cooled liquid throughout cooling loop 14. Temperature control for the water in cooling loop 14 is provided by the operation of auxiliary heat exchanger 27 and proportional diverter valve 28 in response to fluctuations in cooled liquid temperature caused by the heat exchange process in garment line 26 and heat exchanger 18.

If the cooled liquid temperature is too low for user comfort, the proportional diverter valve 28 senses this condition and automatically diverts some of the cooled liquid through auxiliary heat exchanger 27. In the embodiment of FIG. 1, auxiliary heat exchanger 27 exposes the cooled liquid to the heat of the water in which the user is diving to warm the cooled water. The diverted liquid is then returned to the undiverted liquid to raise the average temperature of the cooled liquid as a whole. However, this feature may not be necessary in all embodiments as is illustrated by system 20 in FIG. 3 and system 40 in FIG. 4.

Proportional diverter valve 28 likewise reduces the amount of cooled liquid diverted through auxiliary heat exchanger 27 when the average temperature of the cooled liquid as a whole is too high in order to reduce the temperature. The desired average temperature of the cooled liquid may vary depending upon factors such as the anticipated level of activity and the temperature of the water in which the user is diving, but should generally be at least less than the standard 91° F. skin temperature of the human body and preferably 55°–80° F.

Breathing loop 16 comprises excess cryogen vaporizer 32, suit pressurization regulator 34, ejector 36, lines 38*a–e,* overpressure relief regulator 31, backpressure regulator 33, carbon dioxide scrubber 35, humidity control 37, and auxiliary heat exchanger 39. Excess cryogen vaporizer 32 performs two vial safety functions. First not all of the liquid cryogen delivered by dewars 19 to heat exchanger 11 is necessarily vaporized, especially if cooling loop 14 malfunctions, and so vaporizer 32 ensures that no liquid cryogen enters the breathing loop to harm the user. Second, vaporized cryogen can be as cool as −300° F. so vaporizer 32 warms the vaporized cryogen to a breathable temperature. Once all liquid cryogen is vaporized and warmed, it is introduced to breathing loop 16 via alternative paths through suit pressurization regulator 34 and ejector 36.

Breathing loop 16 of system 10 is a semi-closed circuit and so significant amounts of exhaled atmosphere are vented and significant amounts are recycled. Ejector 36 provides the motive force for recycling the vaporized cryogen in a manner well known to those of ordinary skill in the art through momentum transfer of a high velocity gas jet without moving parts. Carbon dioxide scrubber 35 removes carbon dioxide and humidity control 37 removes moisture introduced to the exhaled atmosphere by the metabolic processes of the user.

Suit pressurization regulator 34, overpressure regulator 31 and backpressure regulator 33 operate in conjunction to control the relative pressure in the suit in response to fluctuations in the operating environment's absolute pressure in a manner well known to those in the art. Pressure regulation is generally necessary if the suit pressure is to be maintained at a pressure differential above ambient and/or the external pressure is variable. This configuration is relevant for external pressures above atmospheric pressure, as in underwater, at atmospheric pressures where a small positive pressure prevents contamination, as in hazardous materials handling, or below atmospheric pressures as in space.

Auxiliary heat exchanger 39 provides some temperature regulation by selectively exposing the circulating atmosphere, in thus embodiment, to the temperature of the water in which the user is diving for removing heat from exothermic carbon dioxide and water absorption. Thus, the primary purpose of auxiliary heat exchanger 39 is to dump heat from the vaporized cryogen introduced into breathing loop 14 by scrubber 35 and humidity control 37. Auxiliary heat exchanger 39 may therefore be omitted in some embodiments where there is no need to dump such heat.

Ejector 36, carbon dioxide scrubber 35, suit pressurization regulator 34, overpressure regulator 31, and backpressure regulator 33 may each be any one of several known and commonly available to those in the art. None of the common alternatives for these components is particularly preferred over the others. Humidity control 37, however, is generally preferred to be a desiccant bed for underwater applications as is commonly known and available to those in the art, although other forms of humidity control may be acceptable or even desirable in other embodiments. Furthermore, ejector 36, carbon dioxide scrubber 35, humidity control 37, and auxiliary heat exchanger 39 are not required for embodiments employing open circuit breathing loops as illustrated in FIG. 4 instead of semi-closed circuit breathing loops.

Figure 2B:
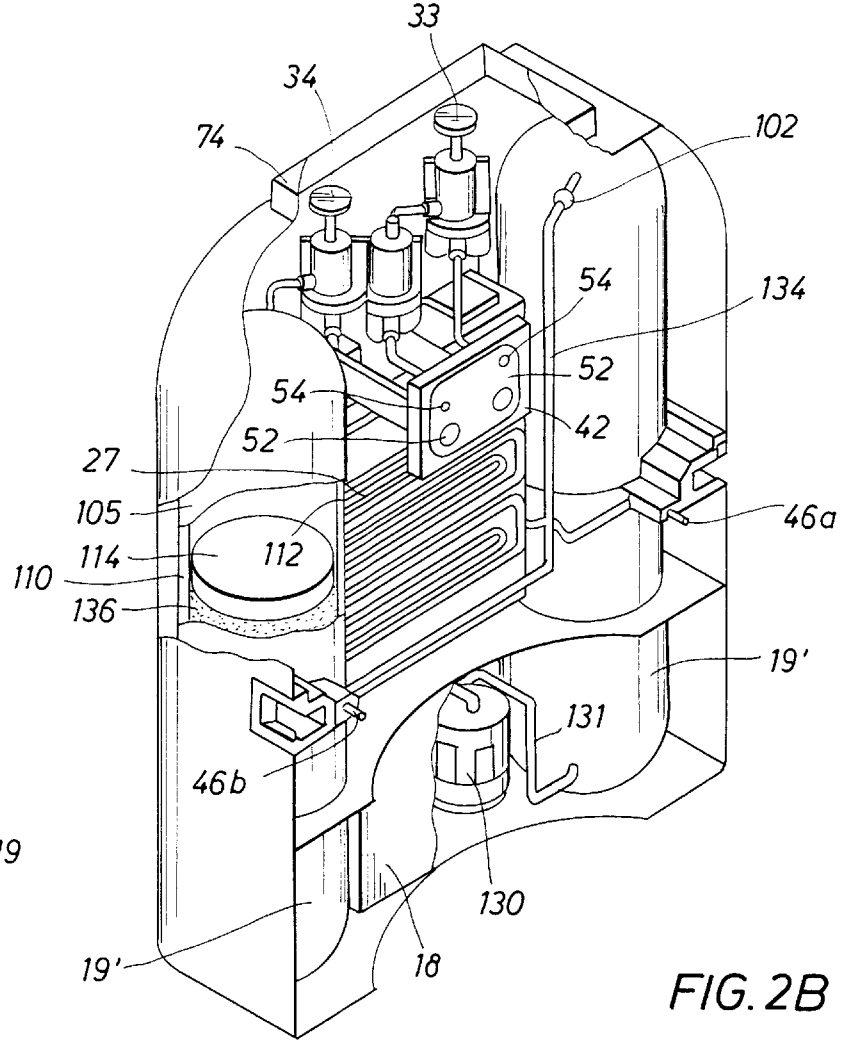
FIGS. 2A and 2B are cutaway, perspective illustrations of a part of a portable life support system that is worn on the back of the user in accordance with the present invention such as the system of FIG. 1 and how it interfaces with the rest of the embodiment comprising the garment and those elements not worn on the back.
Figure 2A:
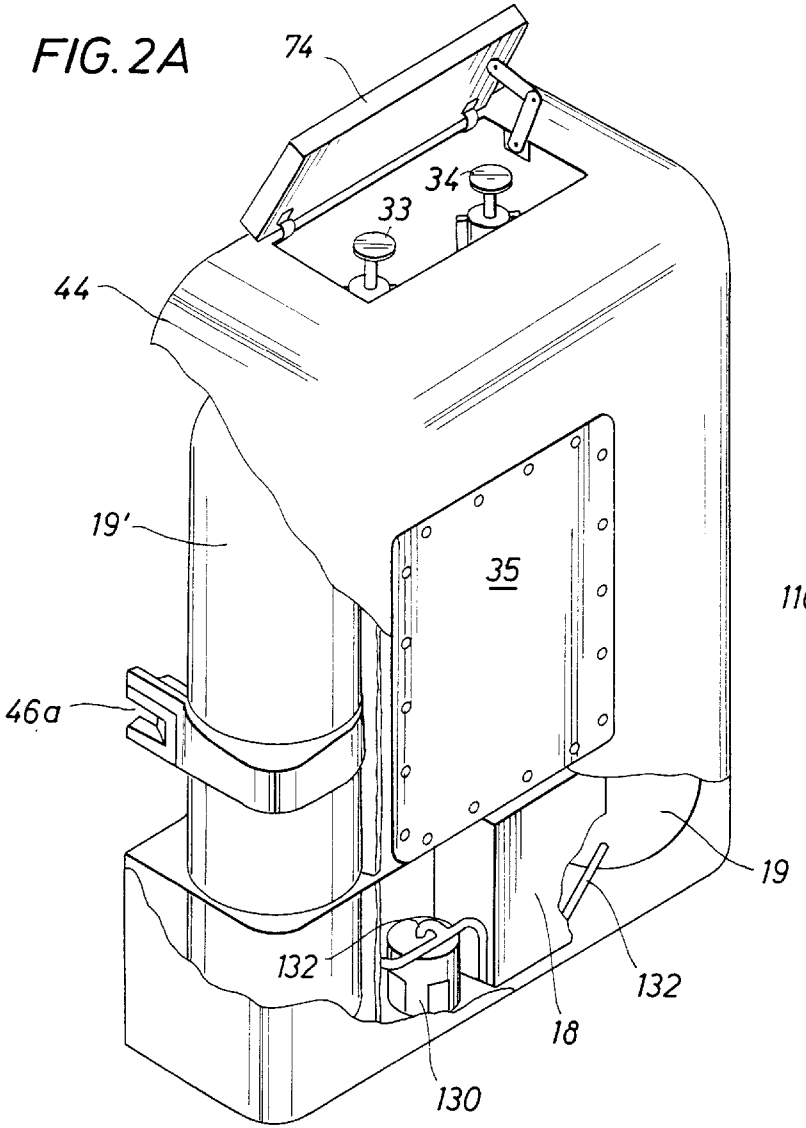
Figure 3:
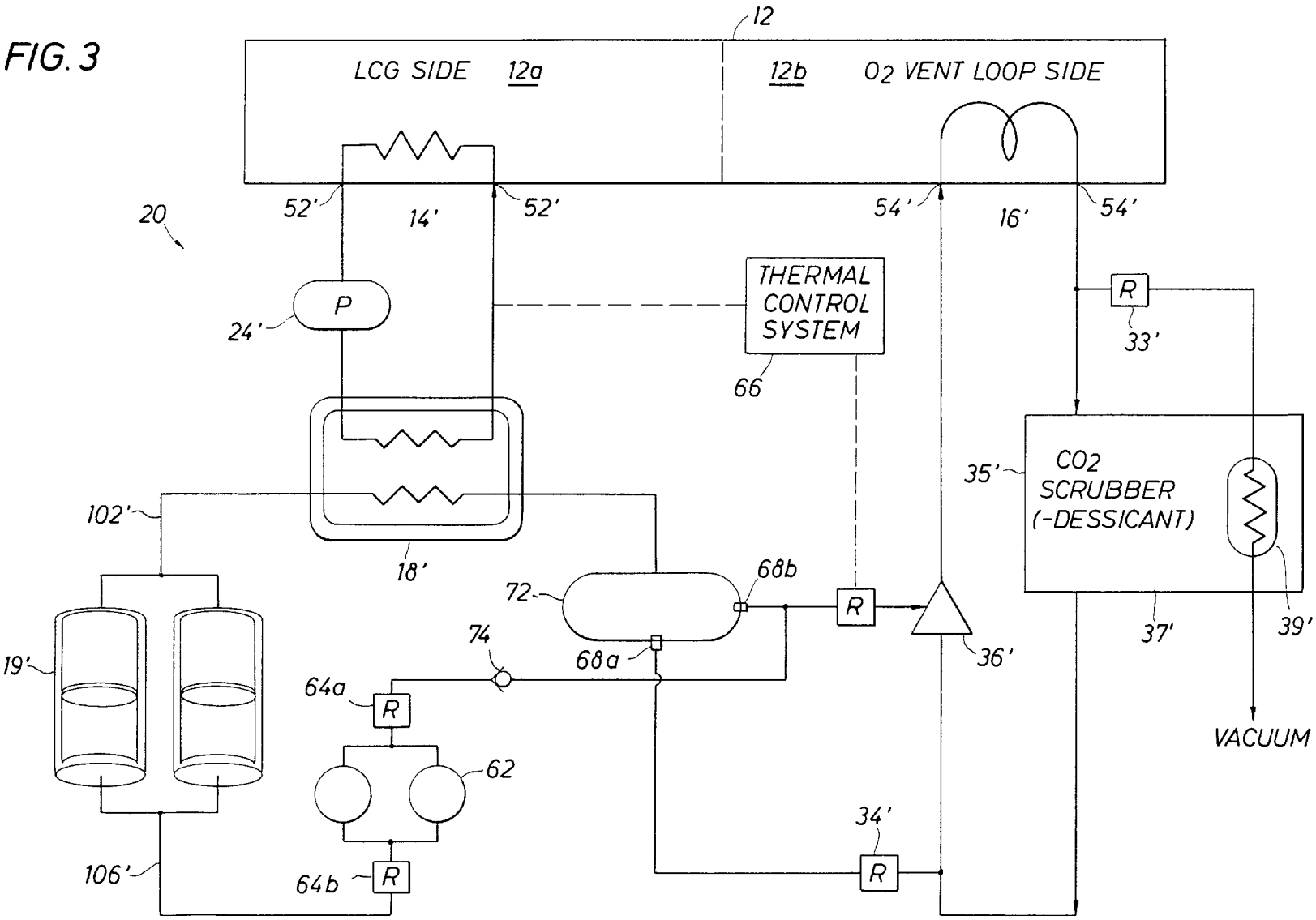
FIG. 3 is a functional schematic illustration of a second, alternative embodiment of a system which also employs a semi-closed circuit breathing loop.

FIGS. 2A and 2B are graphical illustrations of components of a portable life support system such as system 10 in FIG. 1, system 20 in FIG. 3, or system 40 in FIG. 4 the (a) may be worn on the back of the user. The components are mounted in housing 44 and communicate with garment 12 through suit 80 via interface plate 42. Interface plate 42 has ports 52 through which breathing loop 16 enters and leaves the suit for ventilation and ports 54 through which cooling loop 14 enters and leaves the suit to cool the wearer.

A cutaway of one of dewars 19' in FIG. 2B shows a water charged piston mechanism whereas dewars 19 in system 10 of FIG. 1 are self-pressurizing dewars. It is therefore shown that system 10, as well as alternative embodiments system 20 in FIG. 3 and system 40 in FIG. 4 disclosed herein, can employ self-pressurizing dewars or externally charged dewars. The structure and operation of both self-pressurizing dewars and externally pressurized dewars, including differences and similarities between the two, are discussed more fully below.

The "backpack" configuration of FIGS. 2A–B is especially designed to be mounted to a suit (typically called the "SSA" or "space suit assembly") currently used by the National Aeronautics and Space Administration of the United States of America for the Space Transportation System and in its underwater training programs, which is the preferred embodiment of suit 80. Housing 44 is mounted to the hard upper torso of the SSA (not shown) worn by the user of system 10 via mounting means 46*a–b* and several screw connections (not shown) in interface plate 52 in a manner well known to those in the art. The SSA with housing 44 mounted thereto then constitutes what is known as the extra-vehicular mobility unit ("EMU").

Alternative system 20 shown in FIG. 3 also employs a semi-closed circuit breathing loop and consequently has many components in common with system 10 of FIG. 1. Common components having like functions are given like numbers in FIG. 3. For instance, heat exchanger 18' and water pump 24' in FIG. 3 have like functions to heat exchanger 18 and water pump 24 in FIG. 1 previously discussed. The particular embodiment of FIG. 3 is intended for future applications in space whose primary difference from the embodiment of FIG. 1 is the lack of heat exchange with the environment. Cooling control is achieved by varying the flow rate of the cryogen to vaporizer 18'. This embodiment can be used in any environment and employs gas-charged dewars 19'.

Notable difference from the embodiment of FIG. 1 is the addition of secondary oxygen pack 62 and its associated dewar pressurization regulators 64*a–b,* which are included in anticipation of requirements of the National Aeronautics and Space Administration of the United States federal government. As such, secondary oxygen pack 62 and dewar pressurization regulators 64*a–b* are not necessary to the practice of the invention although their inclusion may be desirable for some applications. Their inclusion in the particular embodiment of FIG. 3, however, is necessary as they provide pressurization for dewar 19' as discussed more fully below. Also, dewars 19 in FIG. 1 are modified to provide neutral buoyancy and trim in underwater environments, as discussed further below, which is not a consideration in system 20.

Temperature regulation provided by proportional diverter valve 28 and auxiliary heat exchanger 27 in system 10 of FIG. 1 is provided in system 20 by varying the amount of cryogen delivered to and processed by vaporizer 18 under the control of thermal control system 66 in FIG. 3. Thermal control subsystem 66 could be implemented as a diverter valve and heat exchanger for heating such as is found in FIG. 1. However, this design would have limited utility in some environments whose temperatures are not sufficiently warm to provide the necessary heat to cooling loop 14'.

Excess cryogen vaporizer 32 of FIG. 1 has no analog in FIG. 3. However, low temperature shutoffs 68*a–b* monitor the temperature of cryogen released from accumulator 72 to prevent dangerously cold cryogen from reaching the wearer of the apparatus and the garment 12. The flow of breathable atmosphere in the preferred embodiment of FIG. 3 will not be interrupted by the operation of shutoffs 68*a–b* because of feed from secondary oxygen pack 62 through pressurization regulator 64*a* which bypasses accumulator 72 and shut-offs 68*a–b*.

FIG. 4 is a functional schematic of a third system, generally denoted 40, which employs an open circuit, demand breathing loop. As was true of system 20 in FIG. 3, system 40 has many components in common with system 10 of FIG. 1, and like components bear like numbers. FIG. 4 also has components that are analogous to components found in system 20 in FIG. 3 but not found in system 10 of FIG. 1 that bear like numbers. FIG. 4 also illustrates several features of system 40 common to both system 10 of FIG. 1 and system 20 of FIG. 3 but not shown in those Figures. These features include port 72 through which dewar 19" is filled with liquid cryogen, battery 74 to power water pump 24", and quick-disconnects 76*a–b* that are used to connect components housed separately from liquid cooled garment 12 as shown in FIGS. 2A and 2B, and protective enclosure suit 80.

However, system 40 employs an open-circuit, demand breathing loop and so atmosphere exhaled by the user is not recycled and to this extent system 40 is considerably different from systems 10 and 20. Breathable atmosphere is delivered via positive pressure demand regulator 82 which may be either an oral mask or an oral/nasal mask. Open-circuit demand breathing loop 16" may be equally suitable for application with cooling loop 14 of system 10 in FIG. 1 and cooling loop 14' of system 20 in FIG. 3 just as semi-closed circuit breathing loop 16 and 16' and systems 10 and 20, respectively, may be applicable to system 40 in FIG. 4 when properly modified.

In System 40, body temperature regulation is provided by cooling in two different ways. First, the flow of vaporized cryogen into and out of the user's lungs via the demand regulator 82 is directly related to the user's work rate and, hence, the metabolic heat buildup. The warmed, vaporized cryogen is still cool enough to absorb heat from the user's body during breathing and thereby performs a cooling function. As the user works harder, the rate of liquid cryogen flowing to vaporizer 18" increases. The temperature of cooling loop 14" therefore decreases which provides removal of heat from the user.

When used in environments having near atmospheric pressures, the user's breathing rate will provide approximately two-thirds of the metabolic heat load throughout the range of work rates. In general, additional cooling will be required. This is achieved by the second means of cooling control which is provided by cooling control valve 84. This can be a simple metering valve which the user opens when additional cooling is needed. Opening this valve allows vaporized cryogen to flow directly to the interior of the suit and provides some ventilation to the suit which will remove perspiration. Evaporation of perspiration provides substantial cooling and ventilating the suit improves evaporation and user comfort. The vaporized cryogen used to ventilate the suit is exhausted from the suit through suit pressure relief valve 86 in the suit.

Figure 5:
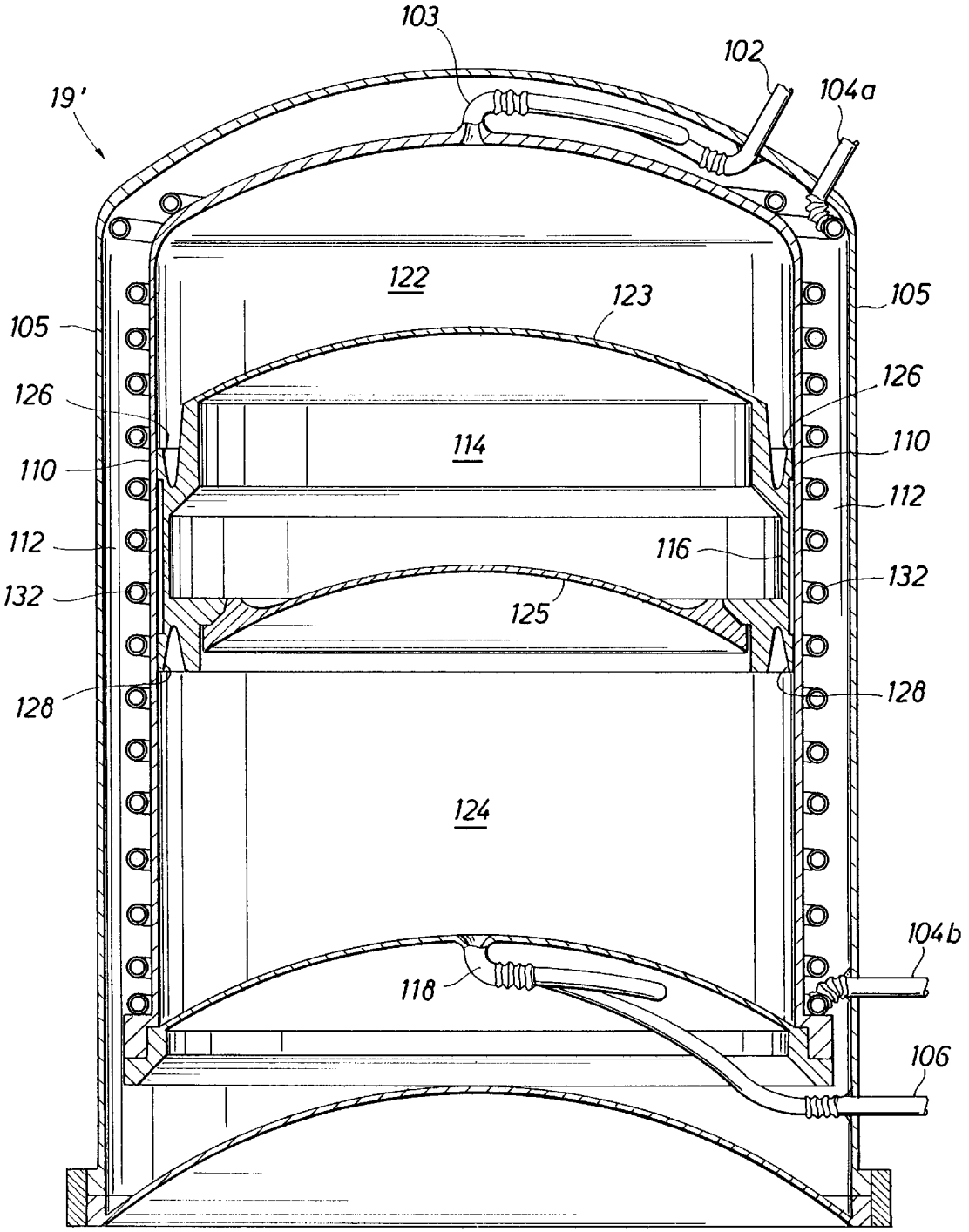
FIG. 5 is an illustration of one embodiment of a positive expulsion dewar having a gas charged piston mechanism as may be employed in the systems of FIGS. 1–4.
Figure 6:
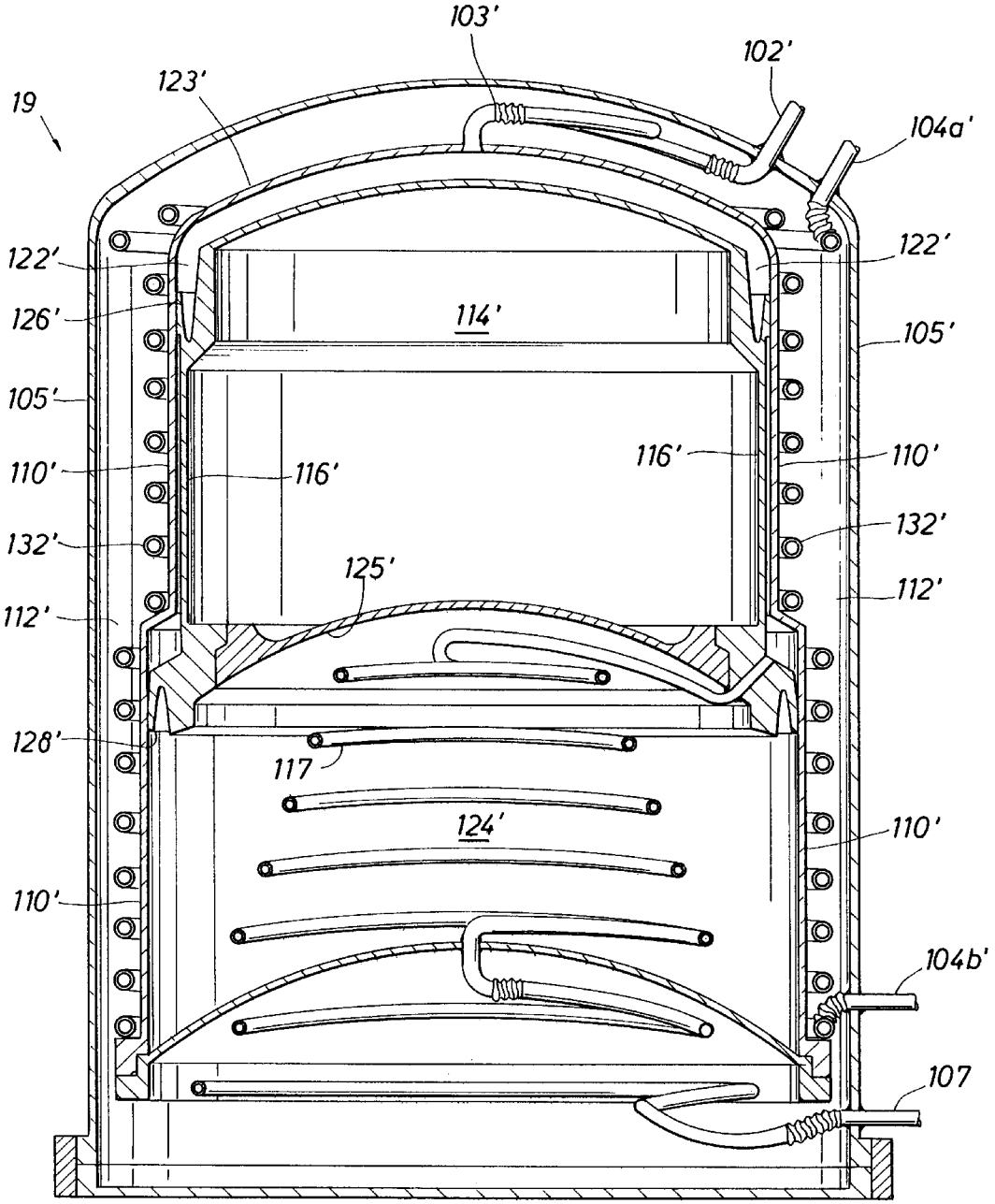
FIG. 6 is an illustration of another embodiment of a positive expulsion dewar having a piston mechanism as may be employed in the systems of FIGS. 1–4.

FIGS. 5–6 illustrate alternative embodiments for dewars 19 and 19' in FIGS. 1, 3, and 4. Technically, a "dewar" is understood in the art to mean a vessel for containing liquid cryogen. However, the alternative embodiments in FIGS. 5–6 each provides a mechanism for positively expelling the liquid cryogen stored therein from the dewar to its associated delivery lines. These embodiments are therefore more properly called "positive expulsion dewars". In this manner, the positive expulsion dewar both stores and delivers liquid cryogen for either the breathing loop. The cooling loop, or both as in the preferred and illustrated embodiments of this invention. The term "dewar" as used herein with reference to the claimed invention shall be understood to mean "positive expulsion dewar."

FIG. 5 is a cross-sectional view of positive expulsion dewar 19' that is externally pressurized and which employs a gas charged piston mechanism. Piston 114 is movably disposed within inner pressure vessel 110 which, in turn, is mounted within outer pressure vessel 105 using a cantilevered spoke design (not shown). The cantilevered spokes run from the exterior surface of inner pressure vessel 110 to the interior surface of outer pressure vessel 105 in chamber 112. Inner pressure vessel 110 can be mounted within outer pressure vessel 105 using equally satisfactory alternatives to cantilevered spokes, such as straps or webbing, as are well known in the art for retaining the heat conduction paths from outer pressure vessel 105 to inner pressure vessel 110. Inner pressure vessel 110 in the preferred embodiment is a 304 L, stainless steel pressure vessel whose contents are insulated by a vacuum induced in chamber 112 between inner pressure vessel 110 and outer pressure vessel 105.

Piston 114 is preferably constructed as a single unit from one or more materials exhibiting low conductivity and expansion characteristics in both structural and sealing applications, such as KEL-F81 or ultra high molecular weight polyethylene (UHMWPE). The internal volume of piston 114 is evacuated and filled with alternating layers of multi-layer insulation for additional insulation of the liquid cryogen as is well known to those in the art. Piston 114 is portrayed in FIG. 5 in a position indicating that the liquid cryogen contents are three-quarters expelled.

Piston 114 defines upper chamber 122, annular chamber 116, and lower chamber 124, by virtue of sealing engagement between annular flange 126 and annular flange 128 and the interior surface of inner pressure vessel 110. The pressure of the contents of chamber 122 exert a force against forward side 123 of piston 114 and the contents of chamber 124 exert a force against reverse side 125 of piston 114. No provisions are made for venting annular chamber 116 between the seals of annular flanges 126 and 128 because piston 114 is of constant diameter and its movement will not be hindered by the buildup of pressure in annular chamber 116.

Liquid cryogen is introduced into and delivered from upper chamber 122 via port 102 and line 103. Prior to filling, piston 114 is retracted by increasing the pressure in chamber 122 relative to chamber 124, whereupon chamber 122 is filled with liquid cryogen. Liquid cryogen is then delivered via line 103 and port 102 to the system heat exchanger such as heat exchanger 18, 18', or 18" in FIGS. 1, 3, and 4, respectively, by supplying pressurized gas to chamber 124 which applies force to piston 114, thereby pressurizing the liquid cryogen in chamber 122.

A gas pressure sufficiently high to positively expel liquid cryogen from upper chamber 122 must be maintained in lower chamber 124. Typically, "sufficiently high" simply means a greater pressure in lower chamber 124 than in upper chamber 122. The preferred method employs an external pressure vessel (not shown) containing was under pressure and a pressure reducing valve (not shown) to ensure that a constant gas pressure is supplied to lower chamber 124.

As piston 114 moves upward and reduces the pressure of the gas in the increased volume of lower chamber 124, the pressure reducing valve allows more gas from the external pressure vessel to enter lower chamber 124 to maintain sufficient gas pressure. The amount of force for positively expelling liquid cryogen can be simply controlled by adjusting the pressure reducing valve to obtain a desired pressure differential between the pressure in lower chamber 124 and upper chamber 122. System 20 in FIG. 3 and system 40 in FIG. 4 are examples of systems employing externally pressurized dewars with a gas charged piston mechanism.

FIG. 2 illustrates an alternative to gas charging dewar 19' which is primarily applicable only for underwater diving. The system includes dewar pressurization pump 130 (shown only in FIGS. 2A–2B) which pumps water 136 obtained from the environment into the lower chamber of dewar 19' defined by piston 114 via line 131 to maintain the differential pressure in dewar 19' during operations. Although this alternative has limited application in most environments other than underwater, the principle of an external means for pressurizing the dewar is analogous to gas charging discussed above. For underwater applications, this pressurization technique has the added advantage over gas-charging of maintaining neutral-buoyancy and trim of the user because the density of the liquid oxygen liquid nitrogen mixture is similar to that of water.

Before filling operations begin, the temperature of inner pressure vessel 110 is generally higher than cryogenic temperatures and so either some liquid cryogen introduced into upper chamber 122 will boil off to cool inner pressure vessel 110 and piston 114 or inner pressure vessel 110 and piston 114 must be pre-cooled. Chamber 112 therefore contains cooling coil 132 used for pre-cooling inner pressure vessel 110 before liquid cryogen is introduced.

Liquid cryogen for pre-cooling enters cooling coil 132 through port **104*a* and exits via port 104*b* and cools inner pressure vessel 110 prior to its fill or recharge. This reduces and minimizes vaporization (or "boil off") of liquid cryogen introduced into upper chamber 122 of inner pressure vessel 110 during filling operations. Cooling coil 132** may be used with a closed-cycle refrigerator for pre-cooling operations. However, in applications where there is no need to minimize consumable waste and boil off of liquid cryogen is acceptable, pre-cool may be omitted altogether.

FIG. 6 illustrates positive expulsion dewar 19 that is self-pressurizing which by virtue of a differential area piston mechanism, with parts having analogs in the embodiment in FIG. 5 having numbers like those analogs. Differential area piston 114' has less pressure responsive surface area on forward side 123' than on reverse side 125' and is profiled to minimize the ullage volume of liquid cryogen at the full stroke position of its movement. Piston 114' engages the interior wall of inner pressure vessel 110' with upper flange 126' and lower flange 128' thereby defining upper chamber 122', annular chamber 116', and lower chamber 124'. Annular chamber 116' deflated in inner pressure vessel 110' by the seals of annular flanges 126' and 128' is vented via line 117 and relief port 107 to prevent the buildup of pressure in annular chamber 116' that would inhibit movement of piston 114' if the either of the seals created by annular flanges 126' and 128' leak. Helical coil 132' provides pre-cool for the dewar for filling operations.

The differential area of piston 114' in FIG. 6 allows for self-pressurization of the dewar. Vaporized cryogen from the heat transfer process described above can be partially diverted into chamber 124' through an analog of line 118 and port 106 of FIG. 5 that is not shown in FIG. 6 for the sale of clarity. Alternatively, as shown in FIG. 1, an auxiliary heat exchanger can be provided to partially vaporize delivered liquid cryogen which can then be diverted to lower chamber 124'. The vaporized cryogen will be at the same pressure as the liquid cryogen in chamber 122' (or a slightly lower pressure) but the surface of forward side 123' of piston 114' in chamber 122' is smaller than is the surface area of reverse side 125' of piston 114' in chamber 124', thus providing the necessary force required to move piston 114'. Thus, there are two ways to overcome frictional forces and to provide pressure for expelling liquid cryogen from the dewar: either by using differential pressure generated from an external source as in the embodiment of FIG. 5 or by using differential area in the piston as in the embodiment of FIG. 6.

It is therefore evident the invention claimed herein may have many alternative and equally satisfactory embodiments without the departing from the spirit or essential characteristics thereof. The invention is adaptable in many facets, ranging from dewar to breathing loop design, depending on the particular application. For instance, all embodiments disclosed herein employ positive expulsion dewars, but dewars employing liquid acquisition devices can be substituted albeit with some loss of performance. The preferred embodiments disclosed above must consequently be considered illustrative and not limiting of the scope of the invention as it may admit to other equally effective embodiments.

What is claimed is:

1. A portable life support system, comprising:

a liquid cooled garment;

*a backpack supporting the life support system comprising:* an orientationally independent dewar for containing liquid cryogen;

means for circulating liquid cryogen from said dewar in heat exchange relation with [the] *a* cooling liquid so as to cool the wearer of the garment and vaporize the liquid cryogen; and means for delivering vaporized cryogen to the wearer of said garment for breathing purposes.

2. The portable life support system of claim 1, wherein the [heat exchanging] *circulating* means comprises:

an insulated housing;

a loop for circulating the cooling liquid through the interior of the garment and the housing; and means for circulating liquid cryogen through the housing intermediate the [source] *dewar* and the delivering means.

3. The portable life support system of claim 2, wherein the delivering means includes a loop for recirculating vaporized cryogen to the wearer of said garment.

4. The portable life support system of claim 1, wherein said orientationally independent dewar is a positive expulsion dewar.

5. The portable life support system of claim 4, wherein said positive expulsion dewar is externally charged.

6. The portable life support system of claim 4, wherein said positive expulsion dewar is self-pressurizing.

7. The portable life support system of claim 1, wherein said means for delivering vaporized cryogen is an open circuit system.

8. The portable life support system of claim 1, wherein said means for delivering vaporized cryogen is a semi-closed system.

9. A portable life support system, comprising:

a liquid cooled garment;

*a backpack supporting the life support system comprising:* an orientationally independent dewar for containing and delivering liquid cryogen; and a heat exchanger for exchanging heat between the cooling liquid and the liquid cryogen delivered from the dewar.

10. The portable life support system of claim 9, wherein said orientationally independent dewar is a positive expulsion dewar.

11. The portable life support system of claim 10, wherein said positive expulsion dewar is externally charged.

12. The portable life support system of claim 10, wherein said positive expulsion dewar is self-pressurizing.

13. A portable life support system, comprising:

a liquid cooled garment through which cooling liquid may be circulated;

*a backpack supporting the life support system comprising:* a source of liquid cryogen; *and* means for delivering liquid cryogen from said source at a varying rate in heat exchange relation with the cooling liquid to cool the cooling liquid, thereby varyingly regulating the temperature of the cooling liquid.

14. A portable life support system as in claim 13, wherein the circulation rate of the liquid cryogen is correlated to the respiration rate of the system user to regulate the temperature of the cooling liquid as the system user's respiration rate varies.

15. A portable life support system as in claim 14, wherein the liquid cryogen is vaporized and the delivering means includes an open-demand breathing loop.

16. A portable life support system as in claim 13, wherein the liquid cryogen is vaporized and the delivering means includes a semi-closed breathing loop.

17. A portable life support system as in claim 13, wherein the cooling liquid, when circulated, is circulated at a constant rate.

18. A portable life support system as in claim 13, wherein said source is an orientationally independent dewar.

19. A portable life support system, comprising:

a liquid cooled garment through which cooling liquid may be circulated;

*a backpack supporting the life support system comprising:* a source of liquid cryogen;

means for circulating liquid cryogen from said source in heat exchange relation with the cooling liquid to cool the cooling liquid and vaporize the liquid cryogen; and means for delivering vaporized cryogen to the wearer of said garment for breathing purposes, said delivering means delivering vaporized cryogen at a varying rate, thereby varyingly regulating the temperature of the cooling liquid.

20. A portable life support system as in claim 19, wherein the delivery rate of the liquid cryogen is correlated to the respiration rate of the system user to regulate the temperature of the cooling liquid as the system user's respiration rate varies.

21. A portable life support system as in claim 20, wherein the delivering means includes an open-demand breathing loop.

22. A portable life support system as in claim 19, wherein the delivering means includes a semi-closed breathing loop.

23. A portable life support system as in claim 19, wherein the cooling liquid, when circulated, is circulated at a constant rate.

24. A portable life support system as in claim 19, wherein said source is an orientationally independent dewar.

*25. A portable life support system, comprising:*

*a backpack housing means supporting a life support system including:*

*an orientationally independent dewar for containing liquid cryogen;*

*a heat exchanger for exchanging heat between liquid cryogen and a heat source; and*

*means for delivering liquid cryogen from said dewar to said heat exchanger in heat exchange relation with the heat source so as to provide vaporized cryogen for breathing purposes.*

*26. The portable life support system of claim 25, wherein said dewar includes said delivering means.*

*27. The portable life support system of claim 25, further comprising*

*a liquid cooled garment exposed to the body heat of its wearer and thermally connected to said heat exchanger, whereby the cooling liquid in said garment exchanges heat with the liquid cryogen in said heat exchanger to cool the wearer and provide vaporized cryogen to the wearer for breathing purposes.*

*28. The portable life support system of claim 25, wherein the heat source is ambient air.*

*29. The portable life support system of claim 25, wherein said delivering means comprises an open-demand breathing loop through which the vaporized cryogen is delivered.*

*30. The portable life support system of claim 25, wherein said delivering means comprises a semi-closed breathing loop through which the vaporized cryogen is delivered.*

*31. As in claim 9, including*

*means for controlling the temperature of the cooling liquid.*

*32. As in claim 27, including*

*means for controlling the temperature of the cooling liquid.*

*33. A portable life support system, comprising:*

*a housing means supporting a life support system of a size and shape to be carried as a backpack including:*

*an orientationally independent dewar for containing liquid cryogen;*

*heat exchange means for circulating liquid cryogen from said dewar in heat exchange relation with a heat source so as to provide vaporized cryogen for breathing purposes; and*

*means for delivering said vaporized cryogen to the wearer of said backpack for breathing purposes.*

*34. A portable life support system according to claim 33 which further includes:*

*a heat exchanger between said heat exchange means and said means for delivering said vaporized cryogen to vaporize any excess liquid cryogen and warm said vaporized cryogen to a breathable temperature.*

* * * * *